US010608539B1

(12) United States Patent
Huang (10) Patent No.: US 10,608,539 B1
(45) Date of Patent: Mar. 31, 2020

(54) MULTI-PHASE POWER SUPPLY FOR STEPDOWN SYSTEM

(71) Applicant: Wiwynn Corporation, New Taipei (TW)

(72) Inventor: Po-Chia Huang, New Taipei (TW)

(73) Assignee: Wiwynn Corporation, New Taipei (TW)

(*) Notice: Subject to any disclaimer, the term of this patent is extended or adjusted under 35 U.S.C. 154(b) by 0 days.

(21) Appl. No.: 16/252,712

(22) Filed: Jan. 21, 2019

(30) Foreign Application Priority Data

Oct. 26, 2018 (TW) .............................. 107137889 A (51) Int. Cl.
*H02M 3/158* (2006.01)
*H02M 3/07* (2006.01)
*H02M 1/32* (2007.01)
*H02M 3/157* (2006.01)
*H02M 1/00* (2006.01)

(52) U.S. Cl.
CPC ......... *H02M 3/1584* (2013.01); *H02M 3/073* (2013.01); *H02M 1/32* (2013.01); *H02M 3/157* (2013.01); *H02M 2001/007* (2013.01); *H02M 2003/077* (2013.01)

(58) Field of Classification Search
CPC .... H02M 2001/007; H02M 1/32; H02M 3/07; H02M 3/073; H02M 3/1584
See application file for complete search history.

(56) References Cited

U.S. PATENT DOCUMENTS

| 5,798,635 | A  | * | 8/1998  | Hwang  | ............... | H02M 1/4225 |
|           |    |   |         |        |                | 323/207     |
| 9,831,776 | B1 | * | 11/2017 | Jiang  | ...................... | H02M 3/158 |
| 9,917,517 | B1 | * | 3/2018  | Jiang  | ....................... | H02M 1/14  |
| 10,256,729| B1 | * | 4/2019  | Notsch | .................... | H02M 1/14  |
| 10,333,392| B2 | * | 6/2019  | Low    | ....................... | H02M 3/073 |

(Continued)

FOREIGN PATENT DOCUMENTS

CN 105308843 2/2016

OTHER PUBLICATIONS

"Office Action of Taiwan Counterpart Application," dated May 7, 2019, p. 1-p. 6.

(Continued)

*Primary Examiner* — Fred E Finch, III
(74) *Attorney, Agent, or Firm* — JCIPRNET (57) ABSTRACT

A multi-phase power supply for stepdown system includes a plurality of first stage voltage converters, a plurality of second stage voltage converters and a controller. The first stage voltage converters are under open-loop control, and the second stage voltage converters are under close-loop voltage regulation control. The first stage voltage converters convert an input voltage to generate a midway voltage. The second stage voltage converters convert the midway voltage to generate an output voltage. The controller receives the output current of each phase of the first stage voltage converters and the second stage voltage converters, the input voltage, the midway voltage of each phase and the output voltage. The controller adjusts a number of enabled phases and balances the output current according to the output currents, and outputs stable power according to the input voltage, the midway voltage and the output voltage.

16 Claims, 6 Drawing Sheets

(56) References Cited

U.S. PATENT DOCUMENTS

| | | | |
|---|---|---|---|
| 2008/0158915 A1* | 7/2008 | Williams | H02M 3/07 363/21.06 |
| 2008/0239772 A1* | 10/2008 | Oraw | H02M 3/07 363/60 |
| 2009/0059630 A1* | 3/2009 | Williams | H02M 3/07 363/60 |
| 2009/0278520 A1* | 11/2009 | Perreault | H02M 3/07 323/282 |
| 2013/0119962 A1 | 5/2013 | Holmberg et al. | |
| 2013/0154600 A1* | 6/2013 | Giuliano | H02M 3/07 323/304 |
| 2015/0097538 A1* | 4/2015 | Le | H02M 3/158 323/271 |
| 2016/0134125 A1 | 5/2016 | Holmberg | |
| 2017/0244318 A1* | 8/2017 | Giuliano | H02M 3/07 |
| 2018/0026526 A1* | 1/2018 | Ahmed | H02M 3/07 323/271 |

OTHER PUBLICATIONS

"Search Report of Europe Counterpart Application", dated Dec. 2, 2019, p. 1-p. 10.

Yanchao Li et al.,"Multilevel modular switched-capacitor resonant converter with voltage regulation", 2017 IEEE Applied Power Electronics Conference and Exposition (APEC), Mar. 26, 2017, pp. 88-93.

* cited by examiner

MULTI-PHASE POWER SUPPLY FOR STEPDOWN SYSTEM

CROSS-REFERENCE TO RELATED APPLICATION

This application claims the priority benefit of Taiwan application serial no. 107137889, filed on Oct. 26, 2018. The entirety of the above-mentioned patent application is hereby incorporated by reference herein and made a part of this specification.

BACKGROUND OF THE INVENTION

Technical Field

The disclosure relates to a stepdown system and, more particularly, to a two-stage multi-phase power supply system.

Related Art

In the prior art, a multi-phase power supply for stepdown system operates through a plurality of voltage converters connected in parallel to output supplied power. Although this method can output power with greater wattage, light load efficiency is sacrificed. Moreover, a single-phase protective mechanism used in the prior art can neither optimize power conversion efficiency nor execute effective protection when abnormalities occur in circuits.

SUMMARY OF THE INVENTION

The disclosure provides a multi-phase power supply for stepdown system capable of improving voltage conversion efficiency.

The multi-phase power supply for stepdown system of the disclosure includes a plurality of first stage voltage converters, a plurality of second stage voltage converters, and a controller. The first stage voltage converter is under open-loop control, and the second stage voltage converter is under close-loop voltage regulation control. The first stage voltage converter converts an input voltage to generate a midway voltage. The second stage voltage converter converts the midway voltage to generate an output voltage. The controller receives an output current of each phase of the first stage voltage converter and the second stage voltage converter, and receives the input voltage, each phase of the midway voltage, and the output voltage. The controller adjusts a number of enabled phases and balances the output current according to the output currents, and regulates the output power according to the input voltage, the midway voltage, and the output voltage.

In an embodiment of the disclosure, the controller calculates the sum of the output currents to obtain a total current value, and sets the number of enabled phases of the first stage voltage converter and the second stage voltage converter according to the total current value.

In an embodiment of the disclosure, the controller further executes a balance state of the output currents of the first stage voltage converters according to the output current, and executes a balance state of the output currents of the second stage voltage converters.

In an embodiment of the disclosure, the controller further generates an overcurrent protective signal according to the output current, wherein single phase protection and full phase protection are included.

In an embodiment of the disclosure, the controller generates an overvoltage protective signal according to the input voltage, the midway voltage, and the output voltage.

In an embodiment of the disclosure, the controller further receives a first phase of the midway voltage generated by the first stage voltage converter and a second phase of the output voltage generated by the second stage voltage converter, and generates a plurality of first control signals and a plurality of second control signals according to the first phase and the second phase, respectively, wherein each of the first control signals and each of the second control signals control each first phase of the midway voltage and each second phase of the output voltage respectively, the first control signal and the second control signal being both digital pulse width modulating signals.

In an embodiment of the disclosure, each first stage voltage converter is one of a switched capacitive buck converter and a synchronous buck converter, and each first stage voltage converter is the other of the switched capacitive buck converter and the synchronous buck converter.

In an embodiment of the disclosure, the switched capacitive buck converter includes a plurality of first switches, a plurality of second switches, a plurality of switch groups, and a plurality of capacitors. The first switch is turned on or off according to the first control signal. The second switch is interleaved in series with the first switch between an input terminal and an output terminal of the switched capacitive buck converter respectively, and is turned on or off according to the second control signal. The switch group is coupled in parallel between the output terminal of the switched capacitive buck converter and a reference ground terminal. Each switch group has a third switch and a fourth switch that are turned on or off respectively according to the first control signal and the second control signal, wherein the first control signal is opposite to the second control signal.

In an embodiment of the disclosure, the switched capacitive buck converter further includes a plurality of inductors that are coupled in series to the capacitors respectively.

In an embodiment of the disclosure, the synchronous buck converter includes a control signal generator, a first transistor, a second transistor, and an inductor. The control signal generator generates a first control signal and a second control signal. The first transistor has a first terminal receiving the first voltage, and a control terminal of the first transistor receives the first control signal. The second transistor has a first terminal coupled to the second terminal of the first transistor, wherein a control terminal of the second transistor receives the second control signal, and a second terminal of the second transistor is coupled to the reference ground terminal. The inductor is coupled between the second terminal of the first transistor and the output terminal of the synchronous buck converter, wherein the output terminal of the synchronous buck converter generates a second voltage.

In an embodiment of the disclosure, a voltage value of the input voltage is greater than a voltage value of the midway voltage, and the voltage value of the midway voltage is greater than a voltage value of the output voltage.

In an embodiment of the disclosure, the controller further detects a plurality of temperatures of the first stage voltage converter and the second stage voltage converter, and generates an over-temperature protective signal according to the temperatures.

In an embodiment of the disclosure, the controller includes a sensed signal reception interface, a signal converter, an operation circuit, and a memory device. The sensed signal reception interface receives the output currents, the input voltage, the midway voltage, and the output voltage. The signal converter is coupled to the sensed signal reception interface to perform analog-to-digital conversion on the output currents, the input voltage, the midway voltage, and the output voltage. The operation circuit is coupled to the signal converter and calculates at least one of the output currents, the input voltage, the midway voltage, and the output voltage, and generates at least one calculation result. The memory device is coupled to the operation circuit.

In an embodiment of the disclosure, the controller further includes a communication device and a clock generator. The communication device is configured to execute transmission and reception of signals with the outside. The clock generator generates an operational clock signal of the controller.

In an embodiment of the disclosure, the voltage value of the midway voltage is 1/N of the voltage value of the input voltage, wherein N is between 4 and 8.

In an embodiment of the disclosure, the voltage value of the midway voltage is N times greater than the voltage value of the output voltage, wherein N is between 2 and 4.

In view of the foregoing, the disclosure provides a two-stage multi-phase power supply for stepdown system whereby the plurality of first stage voltage converters and the plurality of second stage voltage converters in different forms are used for forming two stages respectively. Further, the controller detects the input voltage, the midway voltage, and the output voltage between the stages, and detects the output currents of each first stage voltage converter and each second stage voltage converter. The controller calculates the input voltage, the midway voltage, the output voltage, and the output current value, adjusts voltage conversion of each first stage voltage converter and each second stage voltage converter according to the calculation result, and improves usage safety and voltage conversion efficiency of the multi-phase power supply for stepdown system.

In order to make the aforementioned features and advantages of the disclosure more comprehensible, several exemplary embodiments are described in detail below accompanied with drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
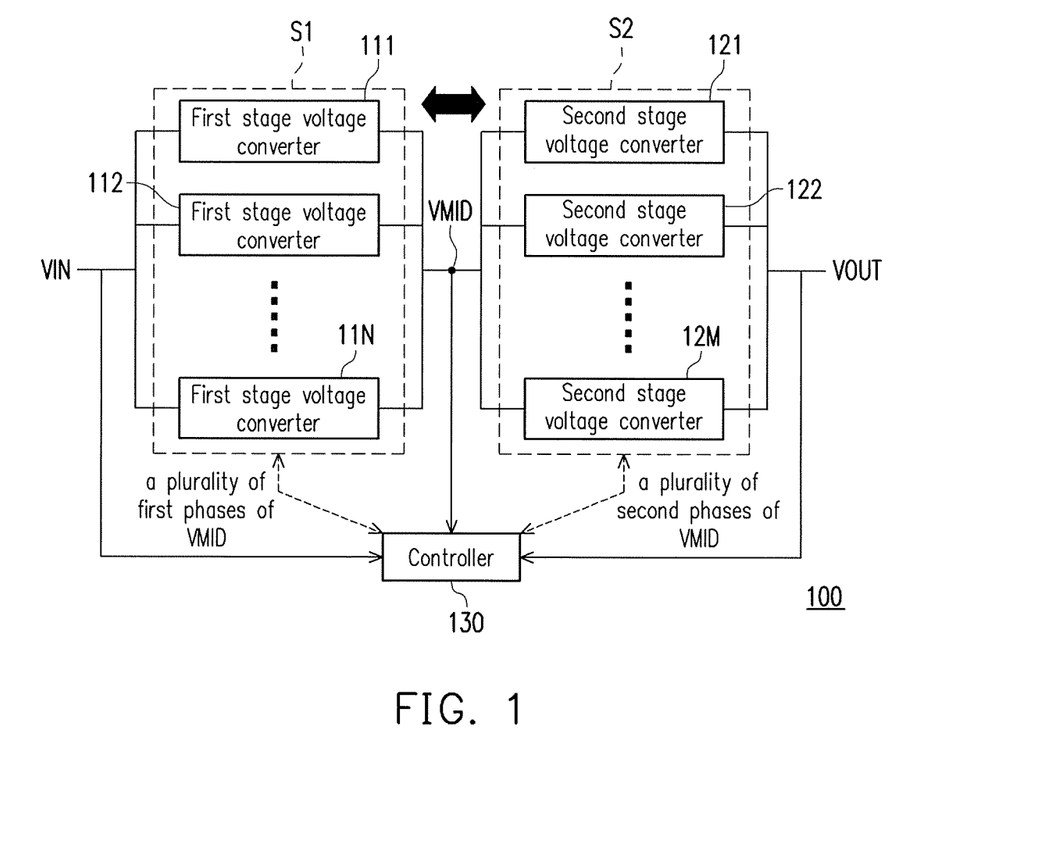
FIG. 1 illustrates a multi-phase power supply for stepdown system according to an embodiment of the disclosure.

Referring to FIG. 1, FIG. 1 illustrates a multi-phase power supply for stepdown system according to an embodiment of the disclosure. A multi-phase power supply for stepdown system 100 includes a plurality of first stage voltage converters 111 to 11N, a plurality of second stage voltage converters 121 to 12M, and a controller 130. The first stage voltage converters 111 to 11N are coupled in parallel to each other and form voltage converters of a first stage S1. The plurality of first stage voltage converters 111 to 11N receive an input voltage VIN collectively and convert the input voltage VIN to generate a midway voltage VMID. The plurality of second stage voltage converters 121 to 12M are coupled in parallel to each other and form voltage converters of a second stage S2. The plurality of second stage voltage converters 121 to 12M receive the midway voltage VMID and convert the midway voltage VMID to generate an output voltage VOUT. The plurality of first stage voltage converters 111 to 11N are configured to generate multiple phases of the midway voltage VMID respectively, the plurality of second stage voltage converters 121 to 12M are configured to generate multiple phases of the output voltage VOUT respectively, and the plurality of first stage voltage converters 111 to 11N and the plurality of second stage voltage converters 121 to 12M generate multiple phases of output currents respectively.

The controller 130 is coupled to the plurality of first stage voltage converters 111 to 11N and the plurality of second stage voltage converters 121 to 12M. The controller 130 can sense a plurality of output currents of the first stage voltage converters 111 to 11N and the second stage voltage converters 121 to 12M, the input voltage VIN, the midway voltage VMID, and the output voltage VOUT. The controller 130 calculates the plurality of output currents of the first stage voltage converters 111 to 11N and the second stage voltage converters 121 to 12M, and adjusts the output currents generated by each of the first stage voltage converters 111 to 11N and each of second stage voltage converters 121 to 12M according to a calculation result. In addition, the controller 130 can calculate the input voltage VIN, the midway voltage VMID, and the output voltage VOUT, and control voltage conversion of each of the first stage voltage converters 111 to 11N and each of the second stage voltage converters 121 to 12M according to the calculation result, wherein the first stage voltage converters 111 to 11N may be voltage converters under open-loop control, and the second stage voltage converters 121 to 12M may be voltage converters under close-loop voltage regulation control.

The controller 130 can initiate overvoltage protection based on quantities of the midway voltage VMID and/or the output voltage VOUT, wherein the controller 130 may determine whether the midway voltage VMID is greater than a preset first threshold voltage value, and generate an overvoltage protective signal when the midway voltage VMID is greater than the preset first threshold voltage value so as to initiate an overvoltage protective mechanism for the first stage voltage converters 111 to 11N. In addition, the controller 130 can determine whether the output voltage VOUT is greater than a preset second threshold voltage value, and generates another overvoltage protective signal when the output voltage VOUT is greater than the preset second threshold voltage value so as to initiate the overvoltage protective mechanism for the second stage voltage converters 121 to 12M.

In the present embodiment, the first stage voltage converters 111 to 11N and the second stage voltage converters 121 to 12M may be different types of voltage converters. Moreover, both the first stage voltage converters 111 to 11N and the second stage voltage converters 121 to 12M may be buck voltage converters. That is, in the present embodiment, the input voltage VIN is greater than the midway voltage VMID, and the midway voltage VMID is greater than the output voltage VOUT.

On the other hand, in the present embodiment, the controller 130 can also detect multiple phases of the midway voltage VMID and multiple phases of the output voltage VOUT generated respectively by all the first stage voltage converters 111 to 11N and the second stage voltage converters 121 to 12M. The controller 130 can generate a plurality of control signals respectively according to the obtained multiple phases of the midway voltage VMID and the obtained multiple phases of the output voltage VOUT so as to control voltage conversion of the first stage voltage converters 111 to 11N and the second stage voltage converters 121 to 12M through the control signal. The controller 130 can regulate the generated output power according to the input voltage VIN, the midway voltage VMID, and the output voltage VOUT.

Note that by setting up a firmware program in the controller 130, the first stage voltage converters 111 to 11N can be configured as one of the first stage S1 and a second stage S2, and the second stage voltage converters 121 to 12M are configured as the other of the first stage S1 and the second stage S2. That is, hardware architecture in the first stage S1 and the second stage S2 can be switched by setting up the firmware program.

Figure 2:
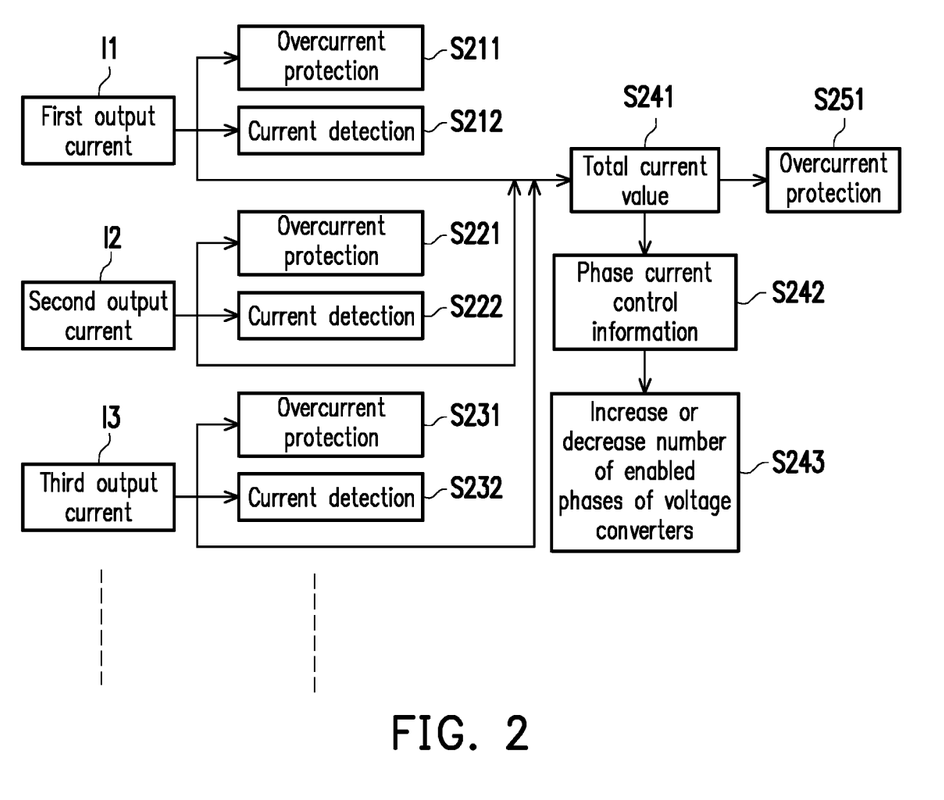
FIG. 2 illustrates an operating way of a controller according to the embodiment of the disclosure.

Details of the detection operation of the output currents are described with reference to FIGS. 1 and 2, wherein FIG. 2 illustrates an operating way of the controller according to the embodiment of the disclosure. The controller 130 can receive the output currents of multiple phases, such as a first output current I1, a second output current I2, and a third output current I3 respectively, generated by the different first stage voltage converters 111 to 11N or the different second stage voltage converters 121 to 12M. The controller 130 performs steps S212, S222, and S232 on the first output current I1, the second output current I2, and the third output current I3 respectively for detection of currents, and determines respectively whether to perform steps S211, S221, and S231 according to quantities of the first output current I1, the second output current I2 and the third output current I3 so as to perform overcurrent protection. For example, the controller 130 can compare the first output current I1 with a first preset threshold value and perform step S211 to generate an overcurrent protective signal when the first output current I1 is greater than the first preset threshold value. Accordingly, by performing overcurrent protection, a voltage converter that generates the first output current I1 is stopped, or the output current generated by the voltage converter is lowered down. The above overcurrent protection may be performed on each of the first stage voltage converters 111 to 11N or each of the second stage voltage converters 121 to 12M, or may be performed on the first stage voltage converters 111 to 11N or the second stage voltage converters 121 to 12M as a whole. That is, the controller 130 can be configured to perform at least one of single phase protection and full phase protection.

On the other hand, the controller 130 can be aware of a state of the output current of each phase of the first stage voltage converters 111 to 11N or the second stage voltage converters 121 to 12M through detection of currents in steps S212, S222 and S232, adjust a number of the enabled phases (numbers of the enabled first stage voltage converters 111 to 11N and the enabled second stage voltage converters 121 to 12M), and perform the phase balance of the output currents.

In addition, in step S241, the controller 130 calculates a total current value of the output currents of the first stage voltage converters 111 to 11N and the second stage voltage converters 121 to 12M. Whether to perform step S251 to initiate overcurrent protection is determined by comparing the total current value with a second preset threshold value, wherein when the controller 130 determines that the total current value is greater than the second preset threshold value, the overcurrent protection in step S251 can be initiated. The controller 130 can perform overcurrent protection in step S251 by turning off some or all of the first stage voltage converters 111 to 11N and the second stage voltage converters 121 to 12M. Alternatively, the controller 130 can perform overcurrent protection in step S251 by lowering down some or all of the output currents of the first stage voltage converters 111 to 11N and the second stage voltage converters 121 to 12M.

On the other hand, when the total current value is not greater than the second preset threshold value, but is greater than or less than a needed value, the controller 130 can perform step S242 to initiate phase current control information and increase or decrease the numbers of the opened first stage voltage converters 111 to 11N and the opened second stage voltage converters 121 to 12M according to the phase current control information. When the total current value is greater than the needed value, the controller 130 can decrease the numbers of the opened first stage voltage converters 111 to 11N and the opened second stage voltage converters 121 to 12M according to the phase current control information. By contrast, when the total current value is less than the needed value, the controller 130 may increase the numbers of the opened first stage voltage converters 111 to 11N and the opened second stage voltage converters 121 to 12M according to the phase current control information.

Note that the phase current control information can record the relationship between the numbers of the opened first stage voltage converters 111 to 11N and the opened second stage voltage converters 121 to 12M and the total current value that may be generated. The controller 130 can adjust (increase or decrease) the number of the opened phases of the first stage voltage converters 111 to 11N and the second stage voltage converters 121 to 12M by searching for the phase current control information according to the needed value of the output current (step S243).

The phase current control information can be stored in a memory device, wherein the memory can be disposed in the controller 130 or be coupled to the controller 130 in a plug-in manner without specific restrictions.

Incidentally, to further improve usage safety and voltage conversion efficiency of the multi-phase power supply for stepdown system 100, in the embodiment of the disclosure, a temperature sensor may be further disposed to sense temperatures of the first stage voltage converters 111 to 11N and the second stage voltage converters 121 to 12M in operation. The controller 130 can perform over-temperature protection on the first stage voltage converters 111 to 11N and the second stage voltage converters 121 to 12M according to the plurality of sensed temperatures. Specifically, when a temperature of at least one of the first stage voltage converters 111 to 11N and the second stage voltage converters 121 to 12M is greater than a preset temperature threshold value, the controller 130 can generate an over-temperature protective signal and stop the voltage conversion of a voltage converter in which an over-temperature event occurs.

Figure 3:
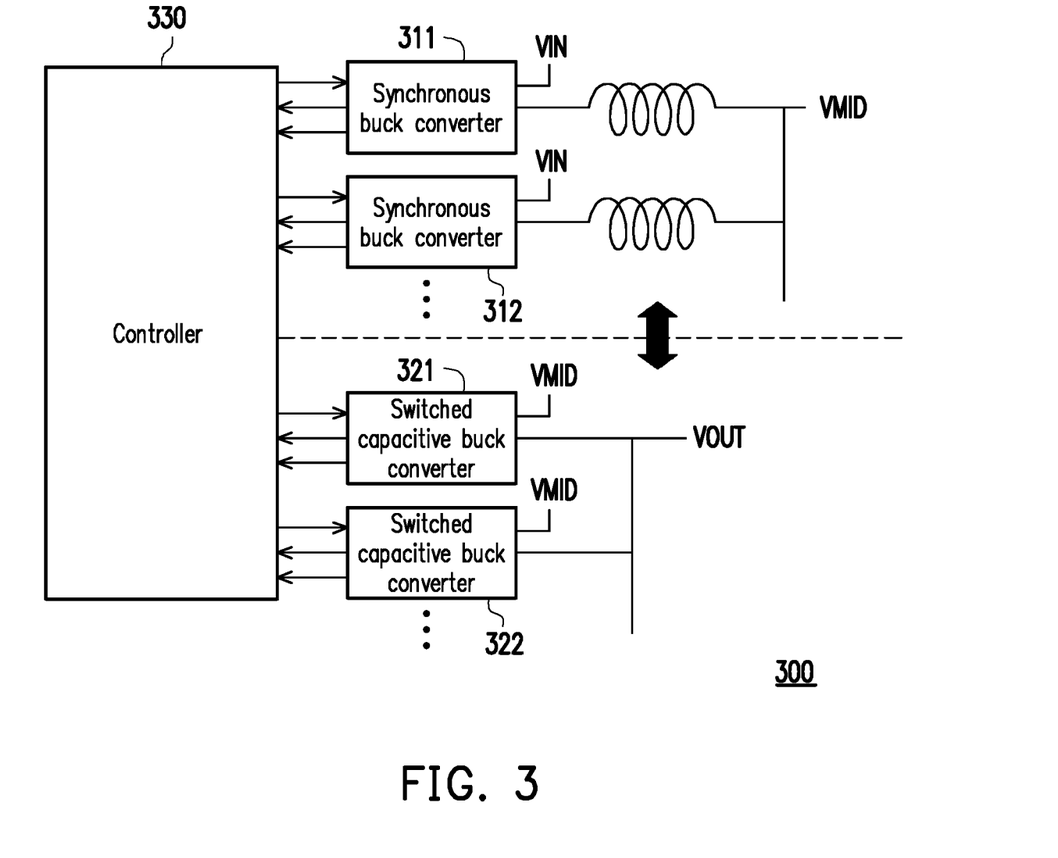
FIG. 3 illustrates a multi-phase power supply for stepdown system according to another embodiment of the disclosure.

Referring to FIG. 3, FIG. 3 illustrates a multi-phase power supply for stepdown system according to another embodiment of the disclosure. A multi-phase power supply for stepdown system 300 includes a plurality of synchronous buck converters 311 to 312, a plurality of switched capacitive buck converters 321 to 322, and a controller 330. The synchronous buck converters 311 to 312 can form first stage voltage converters, and the switched capacitive buck converters 321 to 322 can form a second stage of voltage converters. The synchronous buck converters 311 to 312 receive the input voltage VIN and perform voltage conversion according to control signals provided by the controller 330, thereby generating the midway voltage VMID. The switched capacitive buck converters 321 to 322 receive the midway voltage VMID and perform voltage conversion according to the control signals provided by the controller 330, thereby generating the output voltage VOUT.

In the present embodiment, the controller 330 can operate voltage conversion of each of the synchronous buck converters 311 to 312 and each of the switched capacitive buck converters 321 to 322 through the generated control signals, thereby adjusting the voltages and/or output currents generated by each of the synchronous buck converters 311 to 312 and the switched capacitive buck converters 321 to 322. The controller 330 can turn off or on voltage conversion of each of the synchronous buck converters 311 to 312 and each of the switched capacitive buck converters 321 to 322 through the generated control signals, and generate the output voltage VOUT.

In other embodiments of the disclosure, the first stage voltage converters may also be constructed by the switched capacitive buck converters 321 to 322, and the second stage of voltage converters may also be constructed by the synchronous buck converters 311 to 312. Moreover, in the embodiment of the disclosure, the voltage converters in the first stage and the second stage can be switched through the firmware program in the controller 330.

In the present embodiment, in an application example of the low output voltage VOUT, take the input voltage VIN of 36V to 60V as an example, the voltage value of the midway voltage VMID can be set at 1/N of the voltage value of the input voltage VIN, wherein N is between 4 and 8. In an application example of the fixed output voltage VOUT (e.g., 12V), take the input voltage VIN of 36V to 60V as an example, the voltage value of the midway voltage VMID is N times greater than the voltage value of the output voltage VOUT, wherein N is between 2 and 4.

Figure 4A:
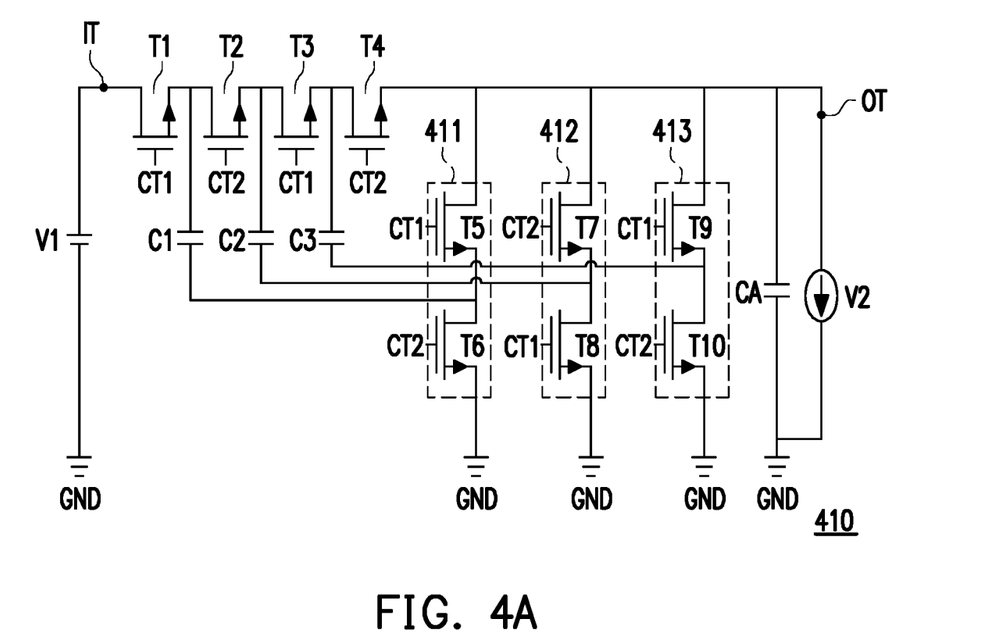
FIGS. 4A and 4B illustrate an implementing method of a switched capacitive buck converter.
Figure 4B:
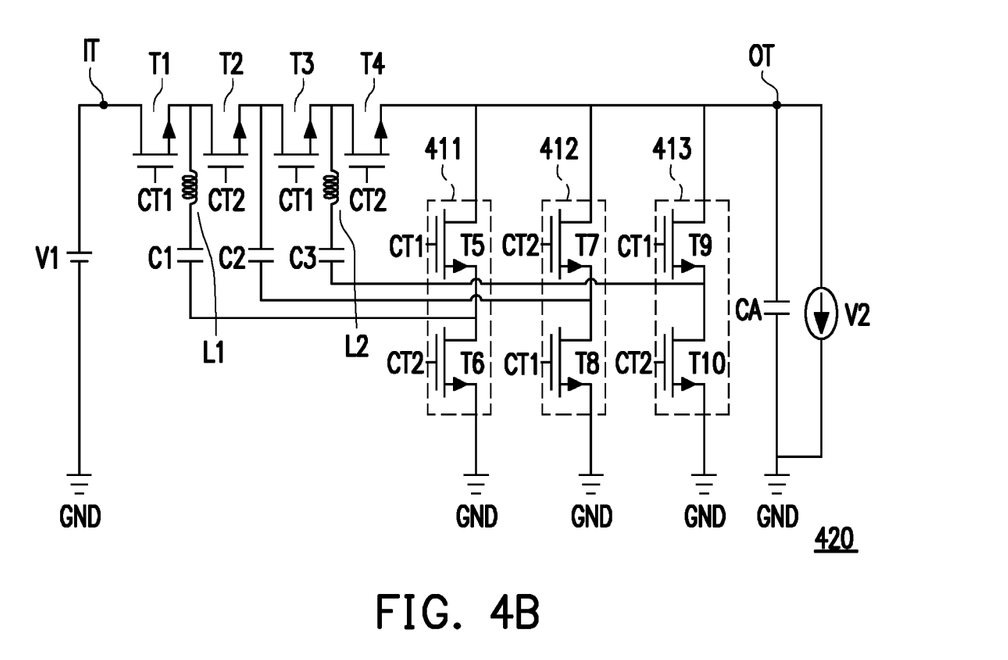
Figure 5:
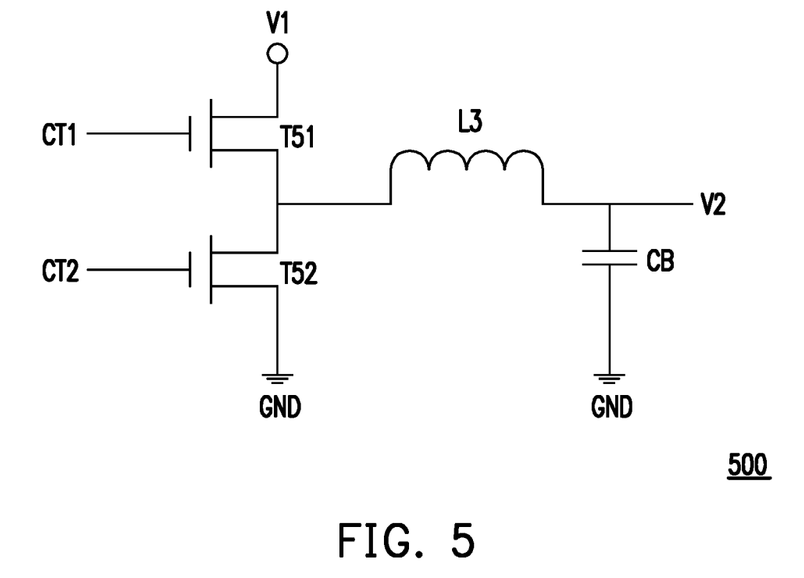
FIG. 5 illustrates an implementing method of a synchronous buck converter.

The hardware architecture of the switched capacitive buck converter and the synchronous buck converter is illustrated respectively in FIGS. 4A and 4B showing an implementing method of the switched capacitive buck converter, and in FIG. 5 showing an implementing method of the synchronous buck converter. Referring first to FIG. 4A, a switched capacitive buck converter 410 includes a plurality of first switches formed of transistors T1 and T3, a second switch formed of transistors T2 and T4, switch groups 411 to 413, and capacitors C1, C2, C3, and CA. The transistors T1 and T3 serving as the first switch are interleaved with and coupled to the transistors T2 and T4 serving as the second switch between an input terminal IT and an output terminal OT of the switched capacitive buck converter 410. The input terminal IT of the switched capacitive buck converter 410 receives a voltage V1, and the output terminal OT of the switched capacitive buck converter 410 generates a voltage V2. When the switched capacitive buck converter 410 is set as a first stage voltage converter, the voltage V1 may be an input voltage, and the voltage V2 may be a midway voltage. When the switched capacitive buck converter 410 is set as a second stage of a voltage converter, the voltage V1 may be a midway voltage, and the voltage V2 may be an output voltage.

In addition, the transistors T1 and T3 serving as the first switch receive a first control signal CT1 and are turned on or off according to the first control signal CT1. The transistors T2 and T4 serving as the second switch receive a second control signal CT2 and are turned on or off according to the second control signal CT2.

The switch groups 411 to 413 are coupled between the output terminal OT of the switched capacitive buck converter 410 and a reference ground terminal GND. Each of the switch groups 411 to 413 has a third switch and a fourth switch that are formed of a transistor respectively. In the present embodiment, the switch group 411 has a third switch and a fourth switch formed of transistors T5 and T6 respectively; the switch group 412 has a third switch and a fourth switch formed of transistors T8 and T7 respectively; and the switch group 413 has a third switch and a fourth switch formed of transistors T9 and T10 respectively. The third switches formed of the transistors T5, T8 and T9 receive the first control signal CT1 and are turned on or off according to the first control signal CT1. The fourth switches formed of the transistors T6, T7 and T10 receive the second control signal CT2 and are turned on or off according to the second control signal CT2.

On the other hand, a terminal of the capacitor C1 is coupled to the coupling terminals of the transistors T1 and T2, and the other terminal of the capacitor C1 is coupled to the coupling terminals of the transistors T5 and T6. A terminal of the capacitor C2 is coupled to the coupling terminals of the transistors T2 and T3, and the other terminal of the capacitor C2 is coupled to the coupling terminals of the transistors T7 and T8. A terminal of the capacitor C3 is coupled to the coupling terminals of the transistors T3 and T4, and the other terminal of the capacitor C3 is coupled to the coupling terminals of the transistors T9 and T10. In addition, the capacitor CA is a voltage regulation capacitor coupled between the output terminal OT of the switched capacitive buck converter 410 and the reference ground terminal GND.

In the present embodiment, the first control signal CT1 and the second control signal CT2 are opposite to each other, and the types of the transistors T1 to T10 are the same. The first control signal CT1 and the second control signal CT2 are digital pulse width modulating signals and can be switched alternately. A voltage value of the voltage V2 that can be generated by the switched capacitive buck converter 410 is ¼ of the voltage value of the voltage V1 through a duty cycle of 50% and the alternately switched first control signal CT1 and the second control signal CT2.

In FIG. 4B, what is different from the previous embodiment is that the switched capacitive buck converter 420 further includes inductors L1 and L2. The inductors L1 and L2 are coupled in series to the capacitors C1 and C3 respectively. At this point, the currents would have the waveform of a sine wave that suppresses surge currents effectively.

In FIG. 5, a synchronous buck converter 500 includes transistors T51 and T52 as well as an inductor L3. A first terminal of the transistor T51 receives the voltage V1, a control terminal of the transistor T51 receives the first control signal CT1, and a second terminal of the transistor T51 is coupled to a first terminal of the transistor T52. A control terminal of the transistor T52 receives the second control signal CT2, and a second terminal of the transistor T52 is coupled to the reference ground terminal GND. A terminal of the inductor L3 is coupled to the second terminal of the transistor T51, and the other terminal of the inductor L3 generates the voltage V2. When the synchronous buck converter 500 is set as a first stage voltage converter, the voltage V1 may be an input voltage, and the voltage V2 may be a midway voltage. When the synchronous buck converter 500 is set as a second stage voltage converter, the voltage V1 may be a midway voltage, and the voltage V2 may be an output voltage. The capacitor CB is a voltage regulation capacitor coupled between the output terminal of the synchronous buck converter 500 and the reference ground terminal GND.

Figure 6:
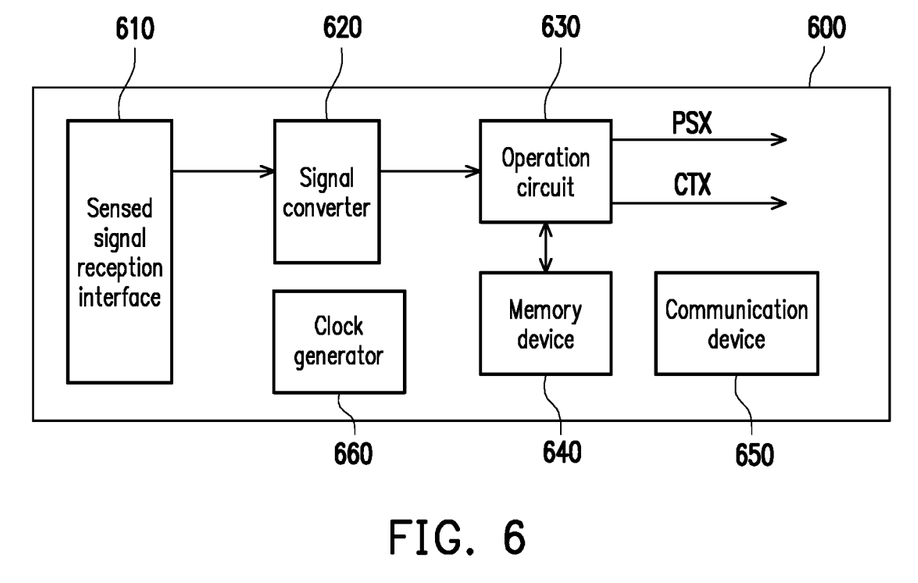
FIG. 6 illustrates an implementing method of the controller according to the embodiment of the disclosure.

Referring to FIG. 6, FIG. 6 illustrates an implementing method of a controller according to an embodiment of the disclosure. A controller 600 includes a sensed signal reception interface 610, a signal converter 620, an operation circuit 630, a memory device 640, a communication device 650, and a clock generator 660. The sensed signal reception interface 610 receives the output currents, the input voltage, the midway voltage, and the output voltage, and can receive information regarding the sensed temperature of the voltage converter. The signal converter 620 can perform signal format conversion (e.g., analog-to-digital conversion) on the information received by the sensed signal reception interface 610, and provide a signal in digital format to the operation circuit 630. The operation circuit 630 may be a digital signal processor (DSP) circuit capable of calculating information regarding the output current, the input voltage, the midway voltage and the output voltage that are received, and generating one or more protective signals PSX or control signals CTX. The memory device 640 can include any form of memory capable of storing information regarding the calculation performed by the operation circuit 630, or storing phase current control information. The phase current control information can be written by performing programming on the memory device 640 to add or update the phase current control information.

In addition, the controller 600 further includes a communication device 650 for communicating information with the outside, and the communication device 650 may be any form of communication device known to those of ordinary skill in the art. In addition, the clock generator 660 is configured to generate an operational clock signal of controller 600. The clock generator 660 can generate a baseband signal through a baseband oscillator, and then multiply the baseband signal through a phase-locked loop circuit to generate an operational clock signal.

Figure 7:
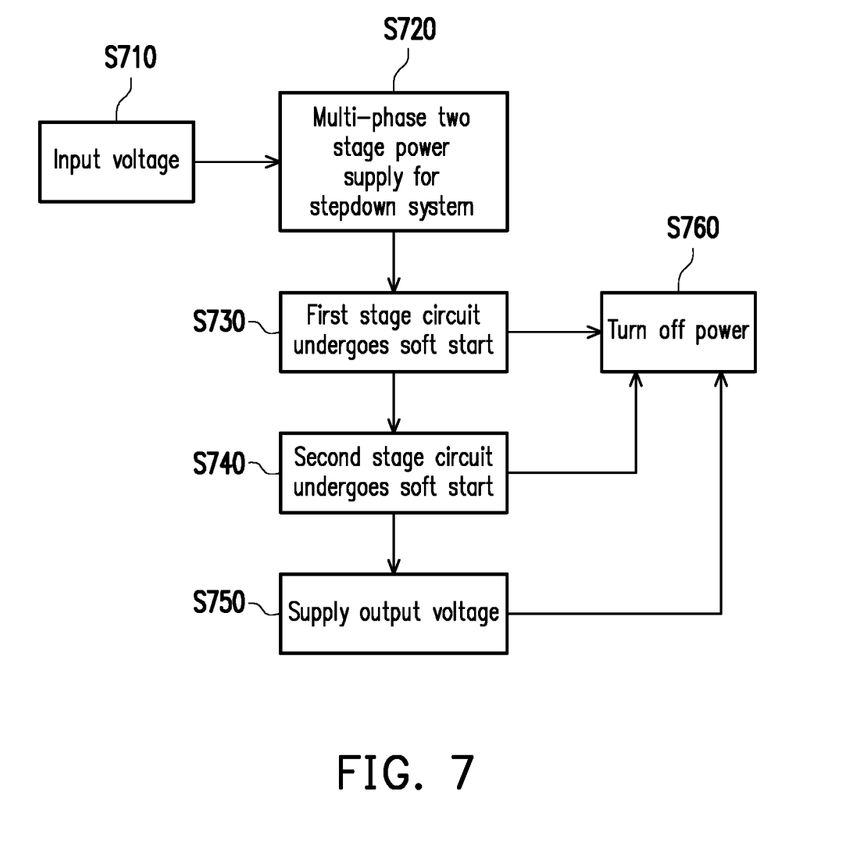
FIG. 7 is a flowchart showing a start-up procedure of the multi-phase power supply for stepdown system according to the embodiment of the disclosure.

Referring to FIG. 7, FIG. 7 is a flowchart of a start-up procedure of a multi-phase power supply for stepdown system according to the embodiment of the disclosure. In step S710, the multi-phase power supply for stepdown system receives the input voltage, and then, in step S720, the multi-phase power supply for stepdown system is initiated. In step S730, a first stage circuit in a phase power supply device undergoes a soft start, and whether the midway voltage increases to greater than a first reference voltage value at a first fixed interval. When the midway voltage increases to greater than the first reference voltage value, step S740 is performed to allow a second stage circuit in the phase power supply device to undergo a soft start. By contrast, if the midway voltage cannot increase to greater than the first reference voltage at the first fixed interval, step S760 is performed to turn off power.

When the second stage circuit undergoes a soft start, it is determined whether the output voltage increases to greater than a second reference voltage value at a second fixed interval. If the output voltage can increase to greater than the second reference voltage value, the output voltage is provided (step S750). By contrast, if it is determined that the output voltage cannot increase to greater than the second reference voltage value at the second fixed interval, step S760 is performed to turn off power.

In view of the foregoing, the disclosure provides a multi-stage, multi-phase power supply for stepdown system whereby the output currents, the input voltages, the midway voltages, and the output voltages of the plurality of voltage converters are sensed by the controller. The output current, the input voltage, the midway voltage, and the output voltage are calculated to adjust the voltage conversion of each voltage converter. Moreover, the controller of the embodiment of the disclosure can adjust each voltage converter according to the actual use of the multi-phase power supply for stepdown system to improve the voltage conversion efficiency and usage safety of the power supply device.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims and their equivalents.

What is claimed is:

1. A multi-phase power supply for stepdown system, comprising:
    a plurality of first stage voltage converters coupled in parallel to each other, the first stage voltage converters converting an input voltage to generate a midway voltage;
    a plurality of second stage voltage converters coupled in parallel to each other, the second stage voltage converters converting the midway voltage to generate an output voltage; and
    a controller that is coupled to the first stage voltage converters and the second stage voltage converters, receives a plurality of output currents of the plurality of first stage voltage converters and the plurality of second stage voltage converters, and receives the input voltage, the midway voltage, and the output voltage, wherein the controller adjusts each of the output currents according to the plurality of output currents, and adjusts voltage conversion of each of the first stage voltage converters and each of the second stage voltage converters according to the input voltage, the midway voltage and the output voltage,
    wherein the controller calculates the sum of the plurality of output currents to obtain a total current value, and sets a number of enabled phases of the plurality of first stage voltage converters and the plurality of second stage voltage converters based on the total current value.

2. The multi-phase power supply for stepdown system of claim 1, wherein the controller further performs output current balancing between the plurality of first stage voltage converters, and performs output current balancing between the plurality of second stage voltage converters according to the plurality of output currents.

3. The multi-phase power supply for stepdown system of claim 1, wherein the controller further generates an over-current protective signal according to the plurality of output currents, and wherein the overcurrent protective signal is configured to perform at least one of single phase protection and full phase protection.

4. The multi-phase power supply for stepdown system of claim 1, wherein the controller generates an overvoltage protective signal according to the input voltage, the midway voltage, and the output voltage.

5. The multi-phase power supply for stepdown system of claim 4, wherein the controller further receives a plurality of first phases of the midway voltage generated respectively by the plurality of first stage voltage converters, receives a plurality of second phases of the output voltage generated respectively by the plurality of second stage voltage converters, generates a plurality of first control signals according to the plurality of first phases, and generates a plurality of second control signals according to the plurality of second phases,
wherein each of the first control signals and each of the second control signals control each of the first phases of the midway voltage and each of the second phases of the output voltage respectively, and wherein the plurality of first control signals and the plurality of second control signals are a plurality of digital pulse width modulating signals.

6. The multi-phase power supply for stepdown system of claim 1, wherein each of the first stage voltage converters is one of a switched capacitive buck converter and a synchronous buck converter, and each of the second stage voltage converters is the other of the switched capacitive buck converter and the synchronous buck converter.

7. The multi-phase power supply for stepdown system of claim 6, wherein each switched capacitive buck converter comprises:
a plurality of first switches that are turned on or off according to a first control signal;
a plurality of second switches that are interleaved in series with the plurality of first switches respectively between an input terminal and an output terminal of the each switched capacitive buck converter, wherein the plurality of second switches are turned on or off according to a second control signal;
a plurality of switch groups that are coupled in parallel to the output terminal of the each switched capacitive buck converter and a reference ground terminal, wherein each switch group has a third switch and a fourth switch, the third switch and the fourth switch being turned on or off respectively according to the first control signal and the second control signal; and
a plurality of capacitors, coupled between the plurality of switch groups and between a plurality of connection points of the plurality of first switches and the plurality of second switches respectively, wherein the first control signal is opposite to the second control signal.

8. The multi-phase power supply for stepdown system of claim 7, wherein the each switched capacitive buck converter further comprises:
a plurality of inductors that are coupled in series to some capacitors of the plurality of capacitors.

9. The multi-phase power supply for stepdown system of claim 6, wherein each synchronous buck converter comprises:

a first transistor having a first terminal receiving a first voltage, wherein a control terminal of the first transistor receives a first control signal;
a second transistor having a first terminal coupled to a second terminal of the first transistor, wherein a control terminal of the second transistor receives a second control signal, and a second terminal of the second transistor is coupled to a reference ground terminal; and
an inductor coupled between the second terminal of the first transistor and the output terminal of the each synchronous buck converter, wherein the output terminal of the each synchronous buck converter generates a second voltage.

10. The multi-phase power supply for stepdown system of claim 1, wherein a voltage value of the input voltage is greater than a voltage value of the midway voltage, and the voltage value of the midway voltage is greater than a voltage value of the output voltage.

11. The multi-phase power supply for stepdown system of claim 1, wherein the controller further detects a plurality of temperatures of the plurality of first stage voltage converters and the plurality of second stage voltage converters, and generates an over-temperature protective signal according to the plurality of temperatures.

12. The multi-phase power supply for stepdown system of claim 1, wherein the controller comprises:
a sensed signal reception interface that receives the plurality of output currents, the input voltage, the midway voltage, and the output voltage;
a signal converter that is coupled to the sensed signal reception interface to perform analog-to-digital conversion on the plurality of output currents, the input voltage, the midway voltage, and the output voltage;
an operation circuit that is coupled to the signal converter, performs a calculation for the plurality of output currents, the input voltage, the midway voltage, and the output voltage, and generates at least one calculation result; and
a memory device that is coupled to the calculation circuit.

13. The multi-phase power supply for stepdown system of claim 12, wherein the memory device stores phase current control information that records the relationship between a number of the plurality of first stage voltage converters and the plurality of the second stage voltage converters that are turned on and a total current value that is generated correspondingly.

14. The multi-phase power supply for stepdown system of claim 12, wherein the controller further comprises:
a communication device for executing transmission and reception of signals with the outside of the multi-phase power supply; and
a clock generator that generates an operational clock signal of the controller.

15. The multi-phase power supply for stepdown system of claim 1, wherein a voltage value of the midway voltage is 1/N of the voltage value of the input voltage, and wherein N is between 4 and 8.

16. The multi-phase power supply for stepdown system of claim 1, wherein a voltage value of the midway voltage is N times greater than the voltage value of the output voltage, and wherein N is between 2 and 4.

* * * * *